United States Patent
Ma et al.

(10) Patent No.: US 10,712,640 B2
(45) Date of Patent: Jul. 14, 2020

(54) SPECKLE REDUCED LASER PROJECTION WITH COLOR GAMUT OPTIMIZATION

(71) Applicant: McMaster University, Hamilton (CA)

(72) Inventors: Qianli Ma, Hamilton (CA); Chang-qing Xu, Dundas (CA)

(73) Assignee: McMaster University, Hamilton (CA)

(*) Notice: Subject to any disclaimer, the term of this patent is extended or adjusted under 35 U.S.C. 154(b) by 0 days.

(21) Appl. No.: 16/423,087

(22) Filed: May 27, 2019

(65) Prior Publication Data

US 2019/0361327 A1 Nov. 28, 2019

Related U.S. Application Data

(60) Provisional application No. 62/677,124, filed on May 28, 2018.

(51) Int. Cl.
| | |
|---|---|
| *G03B 21/14* | (2006.01) |
| *H04N 9/31* | (2006.01) |
| *G03B 21/20* | (2006.01) |
| *G02B 27/09* | (2006.01) |
| *G02B 5/08* | (2006.01) |

(52) U.S. Cl.
CPC ........... *G03B 21/142* (2013.01); *G02B 5/08* (2013.01); *G02B 27/0961* (2013.01); *G02B 27/0977* (2013.01); *G03B 21/2033* (2013.01); *H04N 9/3155* (2013.01); *H04N 9/3161* (2013.01)

(58) Field of Classification Search
CPC ........... G03B 21/2033; G03B 21/142; G02B 27/0961; G02B 27/0977; G02B 21/006; G02B 21/0056; G02B 27/48; H04N 9/3155; H04N 9/3161; G03G 15/04072
See application file for complete search history.

(56) References Cited

U.S. PATENT DOCUMENTS

| | | |
|---|---|---|
| 5,684,566 A | 11/1997 | Stanton |
| 6,445,487 B1 | 9/2002 | Roddy et al. |
| 6,600,590 B2 | 7/2003 | Roddy et al. |
| 6,625,381 B2 | 9/2003 | Roddy et al. |
| 7,271,962 B2 | 9/2007 | Kasazumi et al. |
| 7,457,330 B2 | 11/2008 | Luo et al. |

(Continued)

*Primary Examiner* — William C. Dowling
(74) *Attorney, Agent, or Firm* — Bereskin & Parr LLP/S.E.N.C.R.L., S.R.L.

(57) ABSTRACT

A method of image projection including selecting a set of desired chromaticity coordinates of a projection system, the projection system including a plurality of laser sources; determining a set of parameters of an expected operational environment; and configuring each laser source to have a power ratio and a power spectrum density function generating a normalized power spectrum density function of the projection system having the set of desired chromaticity coordinates and a wavelength diversity factor of at least 2 in the expected operational environment. A projection system including an input device configured to receive a set of desired chromaticity coordinates and a set of operational parameters; a plurality of laser sources each having a power ratio and a power spectrum density function configured to generate a normalized power spectrum density function producing the set of desired chromaticity coordinates and a wavelength diversity factor of at least 2.

22 Claims, 11 Drawing Sheets

(56) References Cited

U.S. PATENT DOCUMENTS

| | | |
|---|---|---|
| 7,596,315 B2 * | 9/2009 | Nakashima ............ H04B 10/07 |
| | | 398/34 |
| 7,959,297 B2 | 6/2011 | Silverstein et al. |
| 8,226,241 B2 | 7/2012 | Chen et al. |
| 8,965,161 B2 | 2/2015 | Domm |
| 8,976,726 B2 * | 3/2015 | Beeler ................ H04B 7/18515 |
| | | 370/316 |
| 9,065,254 B2 | 6/2015 | Geske et al. |
| 9,229,307 B2 | 1/2016 | Manni et al. |
| 2012/0106962 A1 * | 5/2012 | Tanimura ............ H04B 10/505 |
| | | 398/65 |
| 2019/0379461 A1 * | 12/2019 | Irie ...................... H04B 10/572 |

* cited by examiner

SPECKLE REDUCED LASER PROJECTION WITH COLOR GAMUT OPTIMIZATION

RELATED APPLICATIONS

This application claims the benefit of Provisional Application Ser. No. 62/677,124, filed May 28, 2018, the entirety of which is hereby incorporated by reference.

FIELD

This disclosure relates to laser projection, and particularly to speckle reduced color gamut optimization for use with laser projection.

BACKGROUND

U.S. Pat. No. 6,445,487 purports to disclose a system and method for reducing or eliminating the speckle intensity distribution of a laser imaging system. In one embodiment of the invention, a radio frequency (RF) signal is injected into a semiconductor laser light source (12) for a projection system (10) to create different speckle patterns that blend together on a projection surface (19). In another embodiment of the invention, optical feedback is used to induce a laser light source for a projection system (10) to create different speckle patterns that blend together on a projection surface (19). In another embodiment of the invention, the laser light source wavelength is Doppler shifted to produce different speckle patterns. In another embodiment of the invention, a means of deflection is used to directionally move the beam to reduce noticeable speckle. Since the eye is very sensitive to horizontal and vertical edges, but less sensitive to angles in between, beam movement of approximately 45 degrees may minimize the loss of modulation transfer function (MTF) in the horizontal and vertical directions U.S. Pat. No. 7,457,330 purports to disclose a method for reducing speckle noise of a monolithic microchip laser with intracavity beam combining and sum frequency mixing based on time averaging of uncorrelated speckle patterns generated from a large number of independent longitudinal modes and comprises schemes including selections of gain media and nonlinear optical materials to support broadband sum frequency mixing; adoption of gain-conjugated and/or chirped mirrors for flat-top spectra and/or mode phase diversification; multimode laser operation introduced by RF modulation; and multiplication of source modes in frequency mixing process featured with degeneration free and narrowed/uneven intervals. A device and an apparatus for generating low speckle noise red, green, blue lasers adaptable for color display systems are developed based on the inventive method.

U.S. Pat. No. 7,959,297 purports to disclose a digital image projector including a light assembly configured to project light along a light path from at least one laser array light source, the projected light having an overlapping far field illumination in a far field illumination portion of the light path; a temporally varying optical phase shifting device configured to be in the light path; an optical integrator configured to be in the light path; a spatial light modulator located downstream of the temporally varying optical phase shifting device and the optical integrator in the light path, the spatial light modulator configured to be located in the far field illumination portion of the light path; and projection optics located downstream of the spatial light modulator in the light path, the projection optics configured to direct substantially speckle free light from the spatial light modulator toward a display surface.

U.S. Pat. No. 8,226,241 purports to disclose an image projector having one or more broadband lasers designed to reduce the appearance of speckle in the projected image via wavelength diversification. In one embodiment, a broadband laser has an active optical element and a nonlinear optical element, both located inside a laser cavity. The broadband laser generates an output spectrum characterized by a spectral spread of about 10 nm and having a plurality of spectral lines corresponding to different spatial modes of the cavity. Different individual spectral lines effectively produce independent speckle configurations, which become intensity-superimposed in the projected image, thereby causing a corresponding speckle-contrast reduction.

U.S. Pat. No. 9,065,254 purports to disclose an illuminator having a light source to originate an illumination beam, wherein the light source further comprises a set of vertical-cavity surface emitting lasers (VCSELs), including a first VCSEL having a first laser emission wavelength, and a second VCSEL having a second laser emission wavelength different than the first laser emission wavelength. Thus, by varying laser emission wavelengths of VCSELs in a VCSEL array, embodiments of the invention produce low-contrast speckle, and do not limit the imaging capabilities of the host illumination system. In some embodiments of the invention, vertical external cavity surface emitting lasers (VECSELs) are utilized to produce the above described varying laser emission wavelengths.

SUMMARY

In a first aspect, some embodiments of the invention provide a method of image projection, comprising selecting a set of desired chromaticity coordinates of a projection system, the projection system including a plurality of laser sources; determining a set of operational parameters of an expected operational environment, the set of operational parameters including a standard deviation of surface height fluctuation of a projection surface, an incident angle, and an observation angle; and configuring a power ratio and a power spectrum density function of each laser source, the plurality of power ratios and power spectrum density functions generating a normalized power spectrum density function of the projection system having the set of desired chromaticity coordinates and a wavelength diversity factor of at least 2 in the expected operational environment.

In some embodiments, the projection system has a projection path extending between the plurality of laser sources to a projection lens, the projection path including at least one homogenization component.

In some embodiments, the at least one homogenization component includes a diffuser and at least one of a light pipe and/or a pair of lens arrays.

In some embodiments, the projection path includes at least one coupling element between the plurality of laser sources and the at least one homogenization component.

In some embodiments, the coupling element is at least one of a fiber bundle and a mirror.

In some embodiments, the projection path includes a spatial light modulator between the at least one homogenization component and the projection lens and at least one intermediate optical elements between the at least one homogenization component and the spatial light modulator.

In some embodiments, the plurality of laser sources includes a group of green channel laser sources to produce a green chromaticity coordinate of the set of desired chromaticity coordinates, a group of red channel laser sources to produce a red chromaticity coordinate of the set of desired chromaticity coordinates, and a set of blue channel laser sources to produce a blue chromaticity coordinate of the set of desired chromaticity coordinates.

In some embodiments, the set of desired chromaticity coordinates is a set of Rec.2020 chromaticity coordinates.

In some embodiments, the group of green channel laser sources including a set of at least one semiconductor laser diode and a set of at least one diode pumped solid state laser, the at least one semiconductor laser diode having a power ratio of 0.2 and the at least one diode pumped solid state laser having a power ratio of 0.8.

In some embodiments, the set of at least one semiconductor laser diode includes at least two semiconductor laser diodes with a wavelength difference of at least 1.5 nm therebetween and the set of at least one diode pumped solid state laser includes at least two diode pumped solid state lasers with a wavelength difference of at least 0.7 nm therebetween.

In a second aspect, some embodiments of the invention provide a projection system comprising an input device configured to receive a set of desired chromaticity coordinates and a set of operational parameters of an expected operational environment, the set of operational parameters including a standard deviation of surface height fluctuation of a projection surface, an incident angle, and an observational angle; a plurality of laser sources each having an independently configurable power ratio and an independently configurable power spectrum density function; at least one processor coupled to the input device to receive the set of desired chromaticity coordinates and the set of operational parameters, the at least one processor coupled to the plurality of laser sources to set the plurality of power ratios and the plurality of power spectrum density functions to generate a normalized power spectrum density function of the projection system, the normalized power spectrum density function producing the set of desired chromaticity coordinates and a wavelength diversity factor of at least 2 in the expected operational environment; and a projection path extending between the plurality of laser sources and a projection lens.

In some embodiments, the projection system includes at least one homogenization component in the projection path.

In some embodiments, the at least one homogenization component includes a diffuser and at least one of a light pipe and/or a pair of lens arrays.

In some embodiments, the projection path includes at least one coupling element between the plurality of laser sources and the at least one homogenization component.

In some embodiments, the coupling element is at least one of a fiber bundle and a mirror.

In some embodiments, the projection path includes a spatial light modulator between the at least one homogenization component and the projection lens and at least one intermediate optical elements between the at least one homogenization component and the spatial light modulator.

In some embodiments, the plurality of laser sources includes a group of green channel laser sources to produce a green chromaticity coordinate of the set of desired chromaticity coordinates, a group of red channel laser sources to produce a red chromaticity coordinate of the set of desired chromaticity coordinates, and a set of blue channel laser sources to produce a blue chromaticity coordinate of the set of desired chromaticity coordinates.

In some embodiments, the set of desired chromaticity coordinates is a set of Rec.2020 chromaticity coordinates.

In some embodiments, the group of green channel laser sources includes a set of at least one semiconductor laser diode and a set of at least one diode pumped solid state laser, the at least one semiconductor laser diode having a power ratio of 0.2 and the at least one diode pumped solid state laser having a power ratio of 0.8.

In some embodiments, the set of at least one semiconductor laser diode includes at least two semiconductor laser diodes with a wavelength difference of at least 1.5 nm therebetween and the set of at least one diode pumped solid state laser includes at least two diode pumped solid state lasers with a wavelength difference of at least 0.7 nm therebetween.

DRAWINGS

The drawings included herewith are for illustrating various examples of systems, methods, and apparatus of the present specification. In the drawings.

DETAILED DESCRIPTION

Various systems, methods and apparatus will be described below. No embodiment described below limits any claimed embodiment and any claimed embodiment may cover systems, methods, and/or apparatus that differ from those described below. The claimed embodiments are not limited to systems, methods, and apparatus having all of the features of any one system, method, or apparatus described below or to features common to multiple or all described below.

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Figure 1:
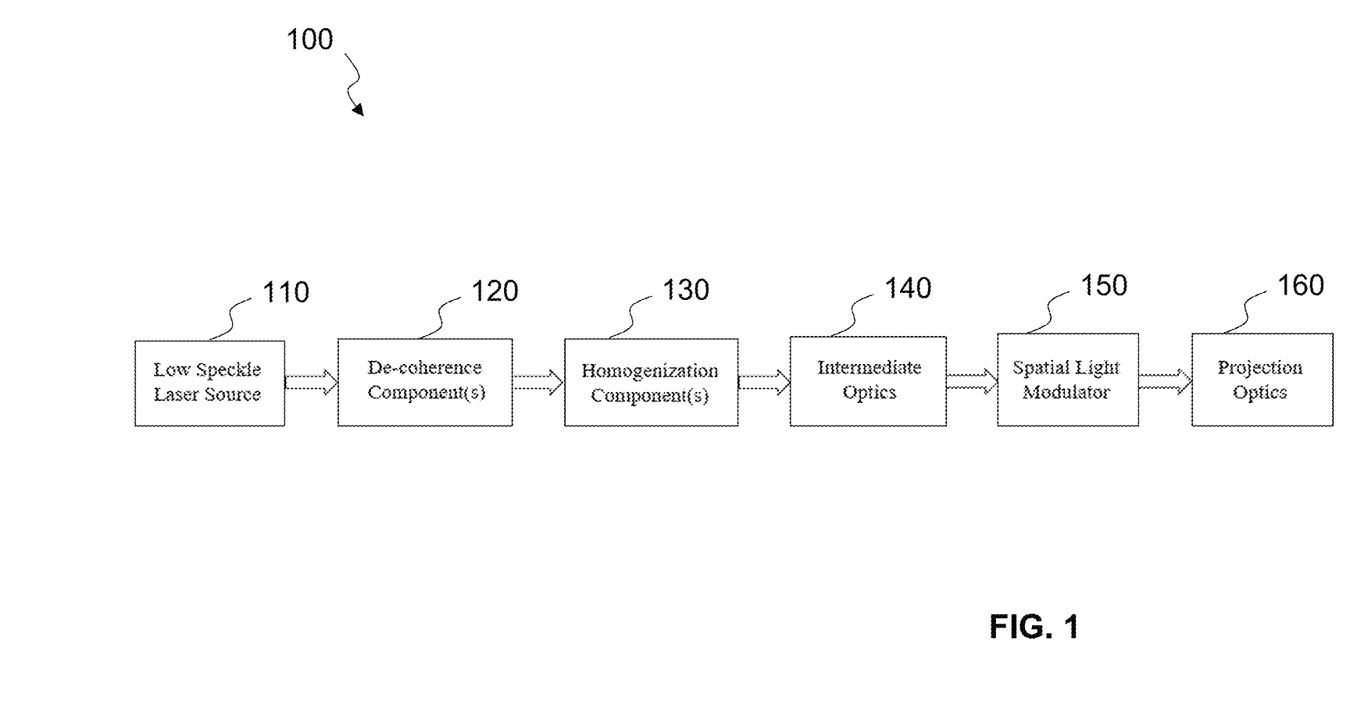
FIG. 1 is a block diagram of a laser projection system.

FIG. 1 is a schematic diagram of an exemplary projection system. Projection system 100 includes a laser source 110, a de-coherence component 120, a homogenization component 130, an intermediate optical element 140, a spatial light modulator 150, and a projection lens 160. The components of system 100 are example components, and in various embodiments a projection system may include other arrangements of components. For example, in some embodiments a projection system includes only a subset of the above, such as a projection system including only a laser source. In some embodiments, a projection system includes one or more further components, such as a projection screen.

A laser source may be a laser bundle including one or more lasers or one or more groups of lasers each including at least one laser. For example, a laser source may include one or more semiconductor laser diodes, one or more diode pumped solid state lasers, and/or one or more vertical-cavity surface-emitting lasers.

Lasers as light sources for projection have wide gamut, high brightness, long lifetime, and high efficiency. However, when laser light is reflected or transmitted by a rough surface, the random interference from the reflected or transmitted light will generate random granular patters called speckle. In laser scanning applications speckle can contribute to detection errors. In display applications speckle can cause image noise.

Speckle level can be represented by a Speckle Contrast Ratio (SCR), which is defined as the standard derivation of intensity fluctuation σ over the average intensity <I>, as set out in Equation 1:

$$SCR = \frac{\sigma}{I} \quad \text{Equation (1)}$$

A SCR of 5% or less is generally at a level that is imperceptible to the human eye; it is below the eye's perception threshold. However, in some circumstances a perception threshold may be lower or higher. For example, the human eye may be more sensitive to certain wavelengths of light, and the threshold may be correspondingly lower.

In a laser projection system, the SCR of the system can be expressed as follows:

$$R = R_\lambda R_\sigma R_\Omega \quad \text{Equation (2)}$$

$$SCR = 1/R \quad \text{Equation (3)}$$

$R_\lambda$ is the wavelength diversity, $R_\sigma$ is the polarization diversity, and $R_\Omega$ is the spatial diversity. Polarization diversity is generally generated by components such as a de-polarized screen. Spatial diversity is generally generated by components such as de-coherence components and homogenization components. In some embodiments, a projection system is configured to reduce speckle using wavelength diversity, with or without reliance on polarization diversity and spatial diversity. However, projection system 100 is configured to reduce speckle using wavelength diversity in addition to spatial diversity resulting from de-coherence components 120 and homogenization components 130.

Projection system 100 uses multiple laser groups in laser source 110 in producing wavelength diversity to reduce speckle, each laser group including at least one laser. Each laser has a wavelength and generates a speckle pattern. If the speckle pattern of a first laser is statistically independent of a speckle pattern of a second laser, when the two speckle patters overlap they generate a light field with reduced speckle.

The speckle reduction effect of a blended source is affected by a variety of factors, including the number of laser sources, the wavelength differences between laser sources, and the line width of laser sources. For example, if the wavelengths of laser sources are too close to one other, the speckle reduction effect will be greatly limited as the laser sources will generate correlated speckle patterns providing little speckle reduction when they overlap. In an extreme example, two laser sources with the same wavelength, same linewidth, and same angle from which they illuminate the screen will result in no speckle reduction effect.

Wavelength diversity of a laser projector which utilizes a plurality of laser sources can impact the size and position of the projector's color gamut. For example, the primary color of the projector can be shifted. For many applications a desired color gamut is defined by well-recognized standards. One example of a color gamut standard for display devices is the International Telecommunication Union Ultra-High-Definition standard, more commonly known as Rec.2020. In some embodiments, adjusting the power ratio and/or wavelength interval between laser sources of a projector allows for an optimization of the resulting color gamut of the projector. In some embodiments, the power ratios and/or wavelength intervals of each laser group can be adjusted while maintaining sufficient wavelength diversity to maintain a speckle level below an imperceptible level.

For a speckle reduction system with "n" laser sources, $g_i(v)$ is the power spectrum density function of the $i^{th}$ laser and the normalized power spectrum density function for the $i^{th}$ laser can be represented using Equation 4:

$$\hat{g}_i = \frac{g_i(v)}{\int_0^\infty g_i(v)dv} \quad \text{Equation (4)}$$

The normalized power spectrum density function for the entire system can be represented using Equation 5:

$$\hat{g} = \Sigma_{i=1}^n C_i \hat{g}_i \quad \text{Equation (5)}$$

$\Sigma_{n=1}^n C_i = 1$, and $C_i$ is the power ratio of the $i^{th}$ laser over the total power.

The wavelength diversity factor $R_\lambda$ can be expressed using the following equations:

$$\frac{1}{R_\lambda} = \sqrt{\int_{-\infty}^{+\infty} K_{\hat{g}}(\Delta v)\mu(\Delta v)^2 d\Delta v} \quad \text{Equation (6)}$$

$$K_{\hat{g}}(\Delta v) = \int_0^{+\infty} \hat{g}(\xi)\hat{g}(\xi - \Delta v)d\xi \quad \text{Equation (7)}$$

μ represents the complex correlation coefficient of two speckle light fields.

By using the random height screen model, μ(Δv) can be expressed as follows:

$$\mu(\Delta v) = M_h(\Delta q_z) \quad \text{Equation (8)}$$

$M_h$ represents the first order characteristic function of the surface height fluctuations and $$\Delta q_z = \frac{2\pi |v|}{c}(\cos\theta_i + \cos\theta_o),$$

such that $\theta_i$ and $\theta_o$ are incident and observation angles, respectively.

For an object with a rough surface whose surface height fluctuation follows Gaussian distribution:

$$|M_h(\Delta q_z)|^2 = \exp(-\sigma_h^2 \Delta q_z^2) \quad \text{Equation (9)}$$

$\sigma_h$ is the standard deviation of surface height fluctuation. For conventional display screens, $\sigma_h$ is approximately 100 µm.

It will be apparent that the wavelength diversity factor $R_\lambda$ for a blended laser light source, such as source 110 of projector system 100, can be calculated using the above. Using the normalized power spectrum density function of the system and the standard derivation of the screen surface roughness, the SCR and optimal power ratio between different wavelengths can be calculated.

Figure 2:
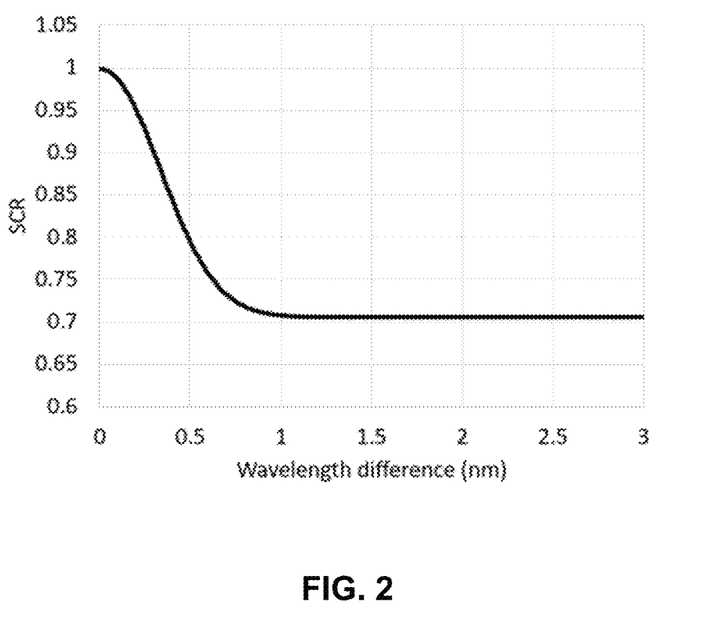
FIG. 2 is a plot of a simulated Speckle Contrast Ratio for a laser projection system of two lasers with ideal monochromic spectrums.
Figure 3:
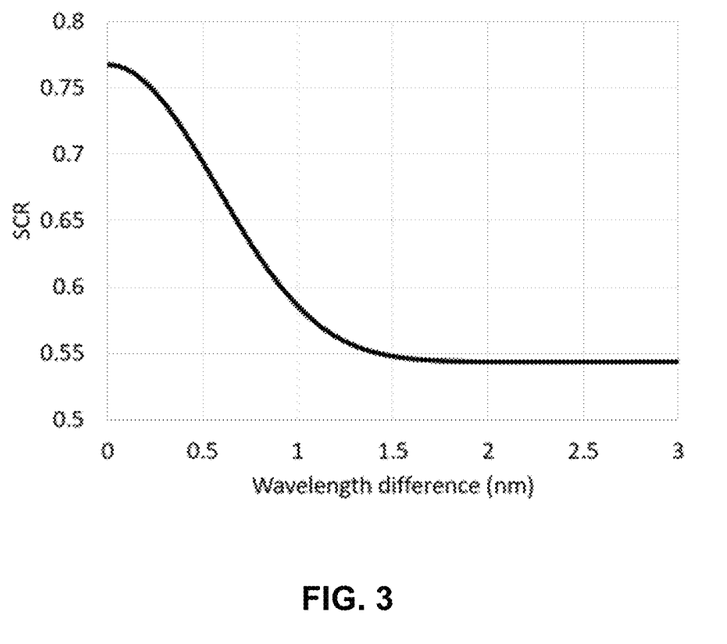
FIG. 3 is a plot of a simulated Speckle Contrast Ratio for a laser projection system of two lasers having a Gaussian profile with a linewidth of 1.2 nm.
Figure 4:
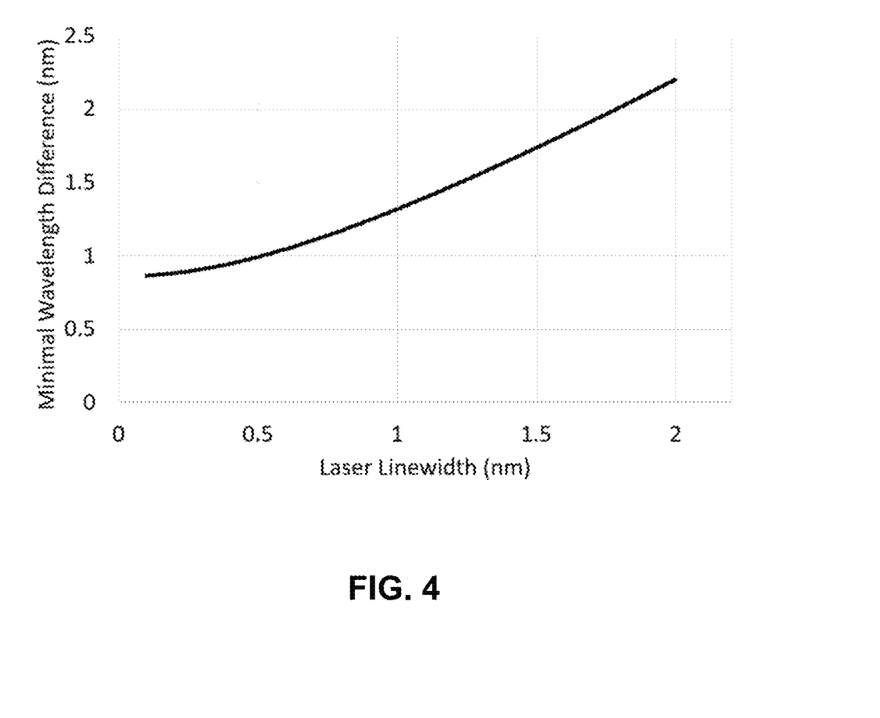
FIG. 4 is a plot of a simulated minimal wavelength interval required between two lasers to achieve maximum wavelength diversity plotted against laser linewidth.

As shown in the examples of FIGS. 2 to 4, wavelength diversity is not generally linearly related to the wavelength difference between lasers of a laser source. Beyond a certain wavelength difference, wavelength diversity is not significantly increased.

FIG. 2 is a graph showing the SCR as a function of wavelength difference between two lasers with ideal monochromic spectrums, calculated using the above equations with polarization diversity and spatial diversity set to one. The two lasers are set to have equal power, which gives $C_1=C_2=0.5$. $\sigma_h$ is 100 µm. As may be seen, when the wavelength gap is close to 0, speckle reduction is limited, as the speckle patterns generated by the different lasers are correlated and overlapping of them on the screen will not provide much speckle reduction. When the wavelength gap is larger than 0.7 nm, the SCR almost reaches the minimal level, which is approximately 71% in this case. This occurs because the speckle patterns generated by different lasers are completely de-correlate when the wavelength interval is larger than 0.7 nm. Accordingly, in some embodiments, the wavelength interval between different wavelengths of monochromic lasers should be larger than 0.7 nm in order to achieve near maximum speckle reduction, but a difference greater than 0.7 nm does not significantly improve speckle reduction.

Generally, having a greater linewidth contributes to the maximum wavelength diversity attainable. FIG. 3 is a graph showing the SCR as a function of wavelength difference between two lasers having a Gaussian profile with a linewidth of 1.2 nm, calculated using the above equations with polarization diversity and spatial diversity set to one. 1.2 nm is the typical linewidth of semiconductor laser diodes. As shown, beyond a wavelength difference of 1.5 nm the SCR is not expected to significantly increase.

FIG. 4 is a graph showing the minimum wavelength difference required to achieve a maximum speckle reduction which is 99% of theoretical maximum speckle reduction, plotted as a function of laser linewidth, with polarization diversity and spatial diversity set to one. As shown, the required wavelength difference increases with the increasing of the laser linewidth.

In some embodiments, determining a minimum wavelength diversity required involves determining or estimating spatial diversity and polarization diversity. For many applications, spatial diversity and polarization diversity can be expected to provide a speckle reduction coefficient of 10. Therefore, to achieve a SCR of less than 5% in such applications the wavelength diversity factor $R_\lambda$ of a light source, such as light source 110, should be at least 2. In other applications, a greater wavelength diversity factor may be needed to maintain a speckle level below an imperceptible level, such as when using a more sensitive image receptor than a human eye or when the polarization diversity factor is 1.

Figure 5A:
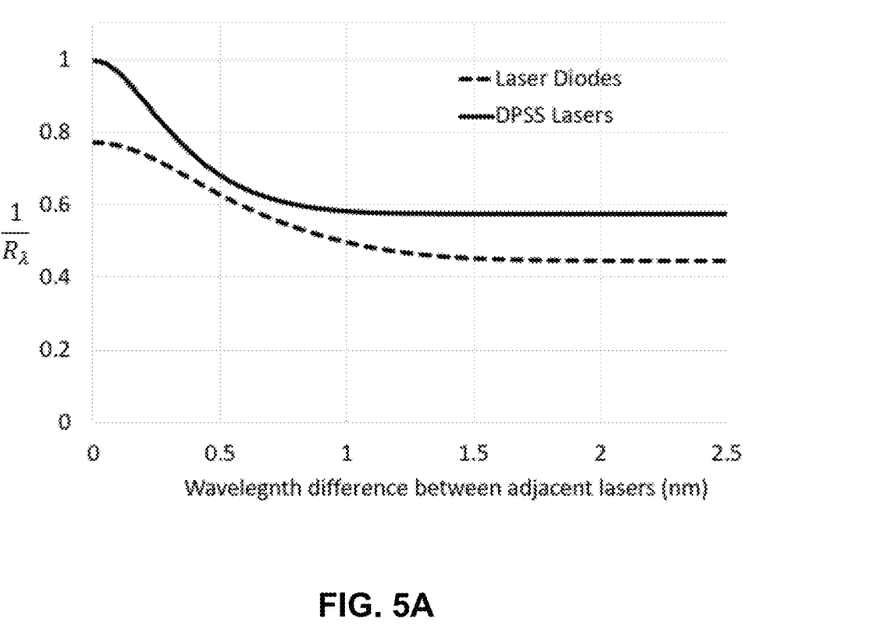
FIG. 5A is a plot of a simulated wavelength diversity factor of three wavelengths blended together.
Figure 5B:
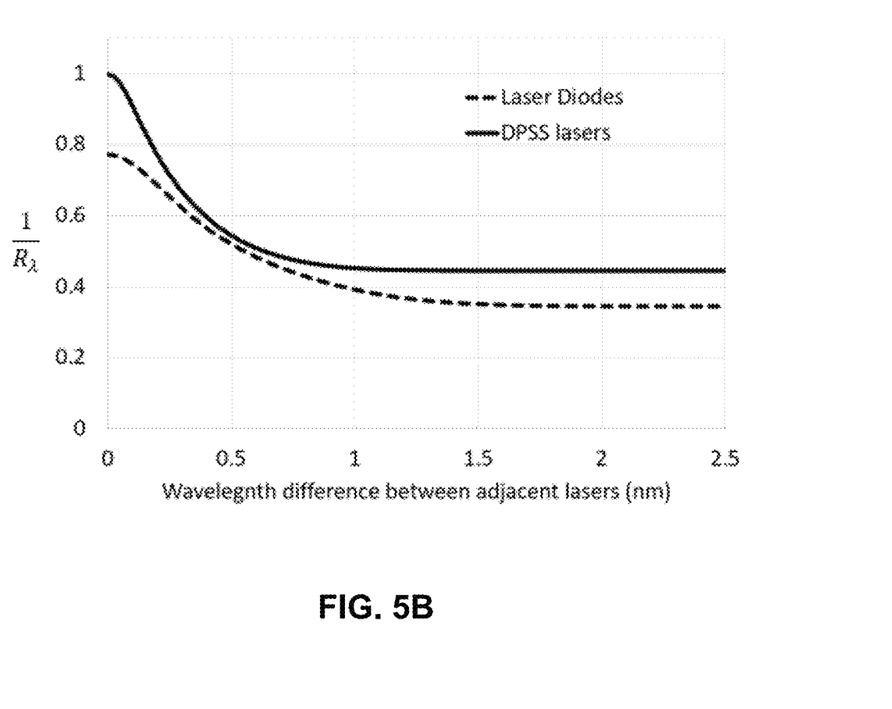
FIG. 5B is a plot of a simulated wavelength diversity of five wavelengths blended together.

Examples of calculated SCR due to wavelength diversity are shown in FIGS. 5A and 5B.

FIG. 5A shows the calculated wavelength diversity of a blended laser source having three groups of lasers in a laser source. The X-axis is the wavelength difference between different groups and the Y-axis is the calculated wavelength diversity $$\frac{1}{R_\lambda}.$$

The dashed line corresponds to a laser source having three groups of semiconductor diode lasers, each laser having a linewidth of 1.2 nm. The solid line corresponds to a laser source having three groups of diode pumped solid state lasers, each laser having a linewidth of 0.1 nm. As wavelength difference increases, the wavelength diversity increases and $$\frac{1}{R_\lambda}$$

decreases. As shown, three groups of semiconductor diode lasers can produce a wavelength diversity factor greater than 2 given sufficient wavelength difference between groups, however three groups of diode pumped solid state lasers do not reach a sufficient wavelength diversity.

FIG. 5B shows the calculated wavelength diversity of a blended laser source with five groups of lasers. The X-axis is the wavelength difference between different groups and the Y-axis is the calculated wavelength diversity $$\frac{1}{R_\lambda}.$$

The dashed line corresponds to a laser source consisting of blended semiconductor diode lasers. The solid line corresponds to a laser source derived from blended diode pumped solid state lasers. With five groups of lasers, even the diode pumped solid state lasers reach a wavelength diversity factor of greater than 2.

Figure 6:
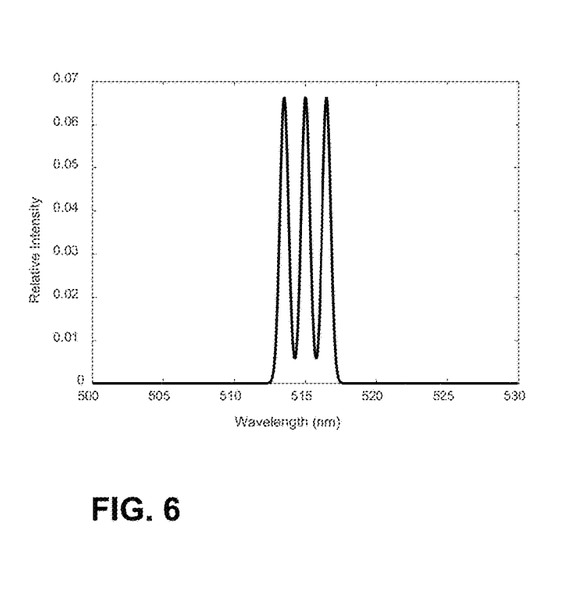
FIG. 6 is a graph of a simulated wavelength blending spectrum of an embodiment having semiconductor laser diodes.
Figure 7:
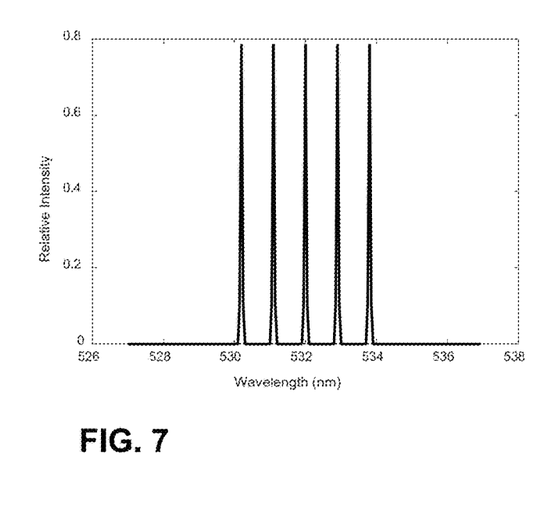
FIG. 7 is a graph of a simulated wavelength blending spectrum of an embodiment having diode pumped solid state lasers.
Figure 8:
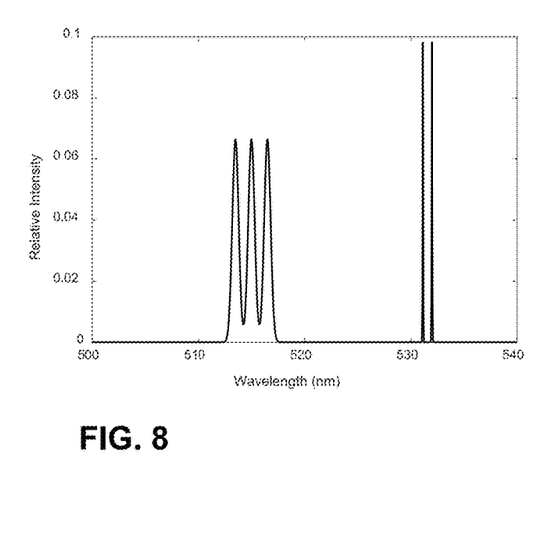
FIG. 8 is a graph of a simulated wavelength blending spectrum of an embodiment having both semiconductor laser diodes and diode pumped solid state lasers.

Examples of spectrums of laser sources which produce wavelength diversity factors of greater than 2 given sufficient wavelength difference are shown in FIGS. 6 to 8.

FIG. 6 shows a spectrum of a laser source having semiconductor laser diodes, each with a linewidth of 1.2 nm. The wavelength gap is set to 1.5 nm. Three laser groups are used, each having one laser. While green wavelengths are used, it will be apparent that the wavelength difference requirement and laser number requirements also apply to red and blue channels of a projector.

FIG. 7 shows a spectrum of a laser source having diode pumped solid state lasers, each with a linewidth of 0.1 nm. The wavelength gap is set to 0.7 nm. Five laser groups are used, each having one laser. It will be apparent that the laser wavelengths spread evenly around 532 nm, satisfying the green channel wavelength requirement for Rec. 2020. Again, while green wavelengths are used, it will be apparent that the wavelength difference requirement and laser number requirements also apply to red and blue channels of a projector.

FIG. 8 shows a spectrum of a laser source having both semiconductor laser diodes with linewidths of 1.2 nm and diode pumped solid state lasers with linewidths of 0.1 nm. Three groups of lasers are blended together. The first group has lasers with linewidths of 1.2 nm and the remaining two groups each have a laser with a linewidth of 0.1 nm. Again, while green wavelengths are used, it will be apparent that the wavelength difference requirement and laser number requirements also apply to red and blue channels of a projector.

Projector 100 is configured to project a color gamut matching a desired color gamut. The power ratio between different groups of lasers or laser groups in laser source 110 is set to allow the desired color gamut to be projected. The color gamut of the projector can be determined by calculating chromaticity coordinates of the red, green, and blue primary colors. The triangle formed by the corresponding points of red, green, and blue primary colors is the color gamut of the projector.

Figure 9:
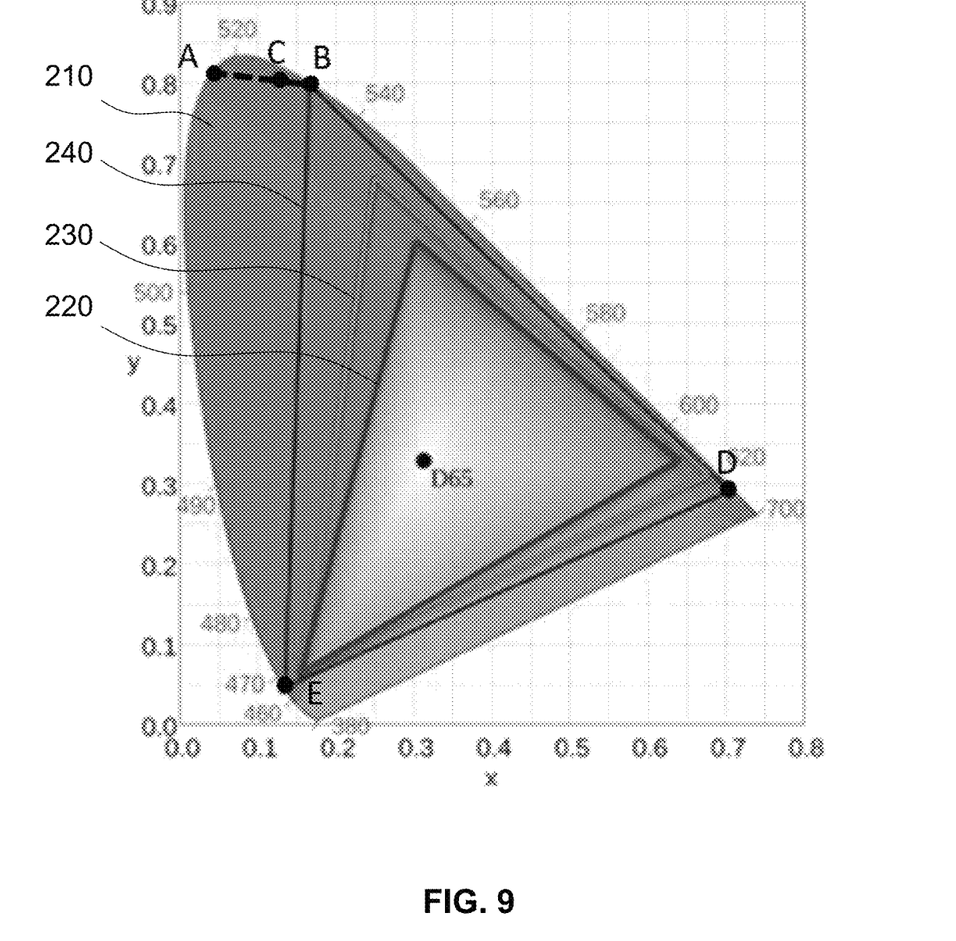
FIG. 9 is a graph of a chromaticity diagram.

FIG. 9 depicts CIE 1931 chromaticity diagram 210. Triangle 220 corresponds to the gamut of Rec.709. Triangle 230 corresponds to the gamut of DCI-P3. Triangle 240 corresponds to the gamut of Rec.2020. Point A corresponds to color coordinates of a semiconductor laser diode with a wavelength of 515 nm and linewidth of 1.2 nm. Point B corresponds to color coordinates of a diode pumped solid state laser with a wavelength of 532 nm and linewidth of 0.1 nm.

In an embodiment in which a group of at least one semiconductor laser diode is blended with a group of at least one diode pumped solid state laser, the power ratio between these two groups can be adjusted to adjust the chromaticity coordinates of the green primary color of the projector along the line between point A and point B. Similar adjustments can be made for lasers forming color coordinates for red and blue, which are shown for simplicity simply as points D and E, respectively.

In this embodiment, when the number of diode pumped solid state lasers is very small, the color gamut triangle will be close to triangle AED, which will result in the absence of yellow color around 580 nm. To avoid the absence of yellow color, the power ratio has to be adjusted so that the chromaticity coordinates of blended green light from the laser source is on the line between Point B and Point C, where line CD overlaps with the top right boundary of the color gamut of DCI-P3. To stay on the line between point B and point C the power ratio P(Semiconductor laser diode):P(Diode Pumped Solid State laser)=0.2:0.8 or less if one laser diode with a center wavelength of 515 nm (Point A) and one diode pumped solid state laser with center wavelength of 532 nm (Point B) are used. In other cases with different numbers of laser sources and different center wavelengths of laser diodes and diode pumped solid state lasers, the power ratio between them can be changed to satisfy the desired chromaticity coordinate accordingly. For example, to cover the Rec.2020 color gamut, point B may be shifted to a longer wavelength, such as 543 nm, so that point C may be located close to 532 nm. The power ratio of red and blue channels can be similarly set to define adjustments to red and blue corners of a color gamut.

Within the limits of the required wavelength diversity, as described above, a laser source, such as source 110, can be adjusted to form a power ratio producing appropriate color coordinates.

FIGS. 10A to 11B show examples of projection systems incorporating laser sources which are configured to provide imperceptible speckle and a desired color gamut.

Figure 10A:
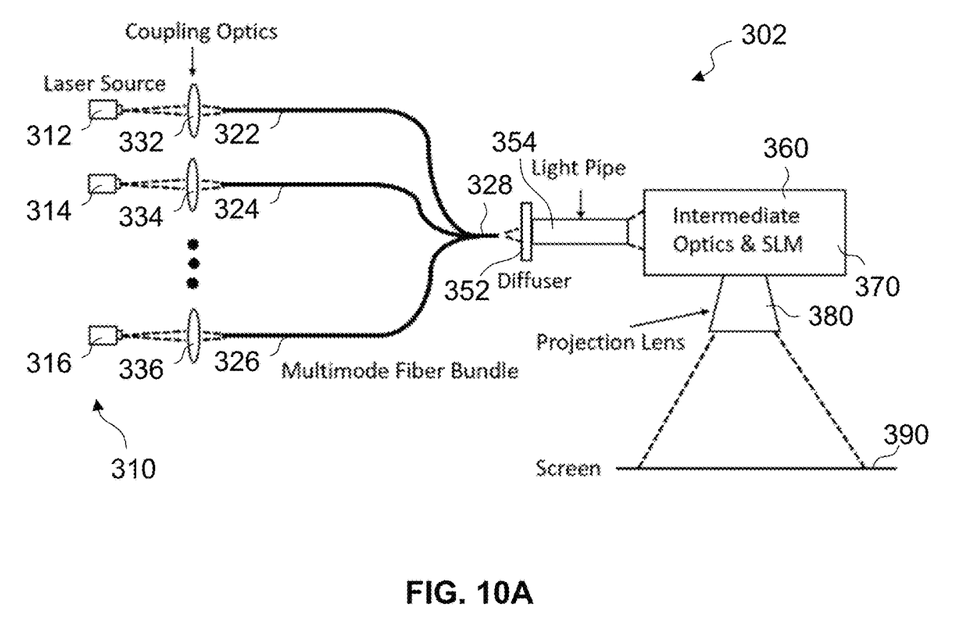
FIG. 10A is a schematic diagram of an embodiment including fibers and a light pipe in a projection path.
Figure 10B:
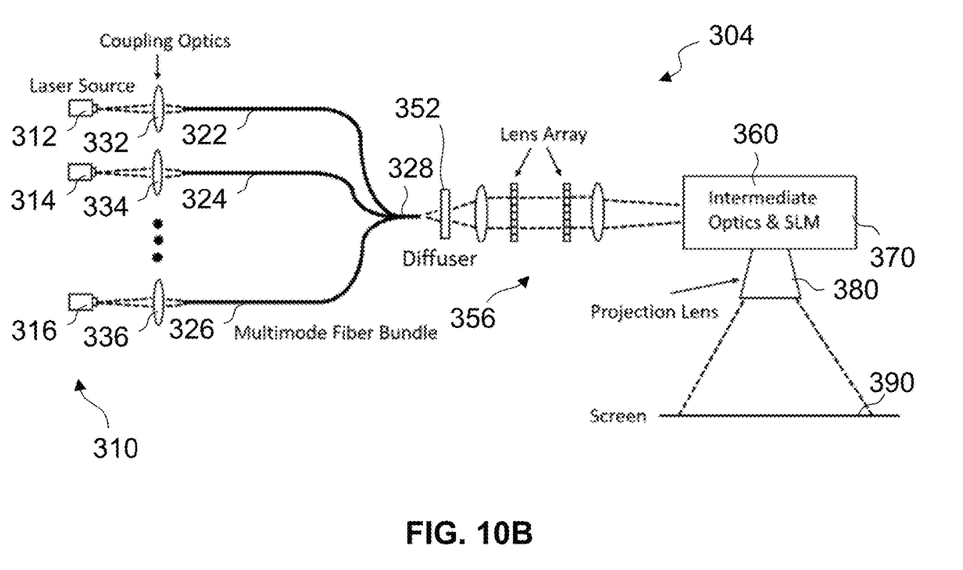
FIG. 10B is a schematic diagram of an embodiment including fibers and a pair of lens arrays in a projection path.

FIGS. 10A and 10B depict projection systems 302 and 304. The laser sources 310, including lasers 312, 314, and 316, direct light to corresponding multimode fibers 322, 324, 326, each via a coupling element 332, 334, 336. The multimode fibers are combined into a fiber bundle 328 at an emitting end. The number of lasers and fibers can vary with the design and operating parameters of the speckle reduction systems, such as due to illumination requirements and laser performance realities.

From the fiber bundle 328, light is directed towards the homogenization component. The homogenization component of FIG. 10A includes a diffuser 352, which can be movable or still, and a light pipe 354. The homogenization component in FIG. 10B includes a diffuser 352, which can be movable or still, and a pair of lens arrays 356.

From the homogenization component, intermediate optical elements 360 are used to collect the refined adjusted light. A spatial light modulator 370 is used to receive the refined adjusted light from the intermediate optical elements 360 and modulate the refined adjusted light to form images. A projection lens 380 is employed to project images onto a screen 390.

Figure 11A:
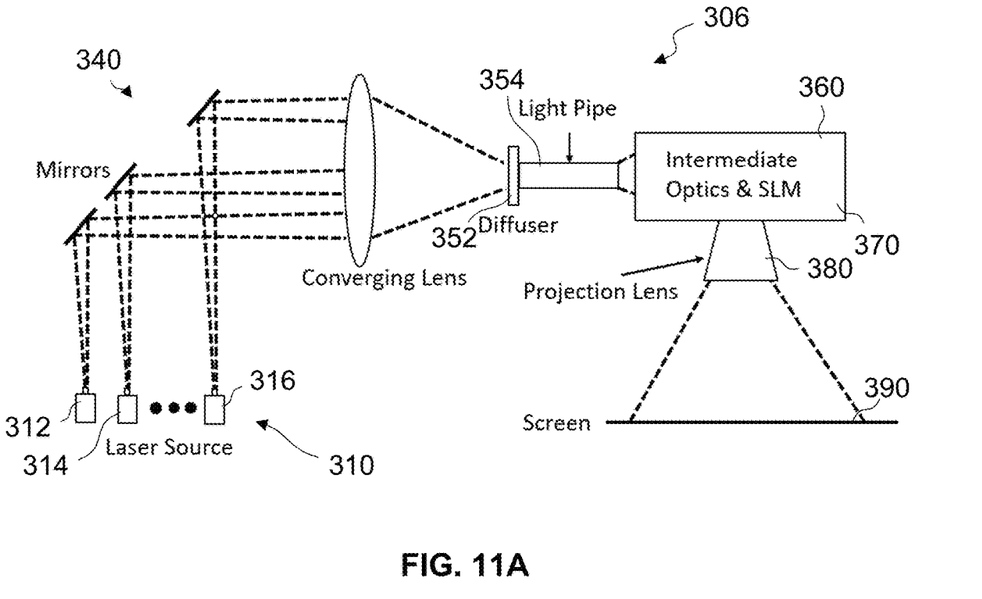
FIG. 11A is a schematic diagram of an embodiment including mirrors and a light pipe in a projection path.
Figure 11B:
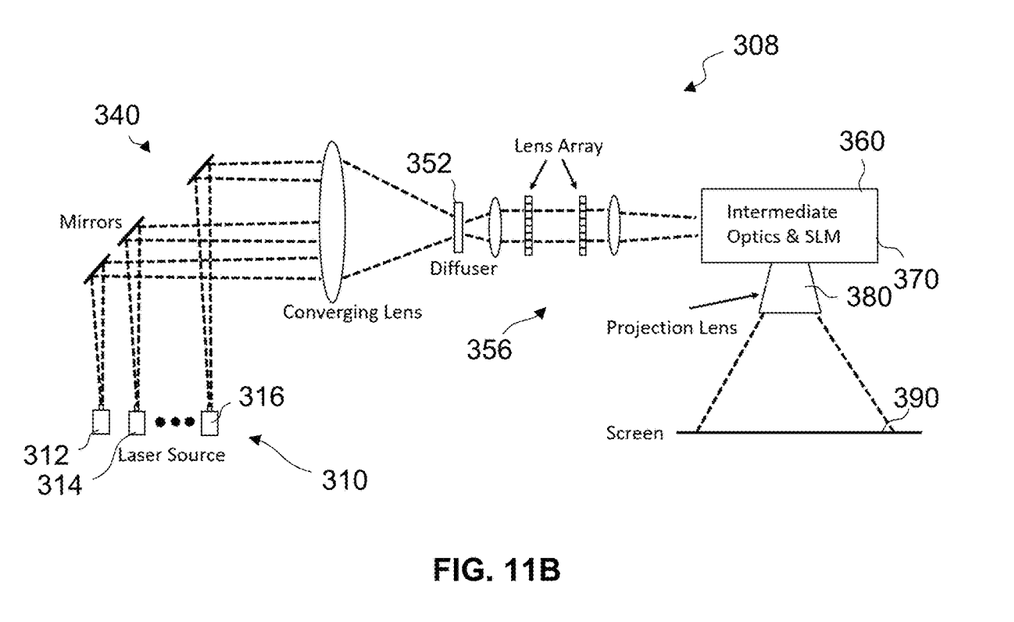
FIG. 11B is a schematic diagram of an embodiment including mirrors and a pair of lens arrays in a projection path.

FIGS. 11A and 11B depict projection systems 306 and 308. System 306 is similar to system 302, however mirrors 340 are used rather than multimode fibers and coupling elements to couple the output of laser sources 310 to homogenization components. System 308 is similar to system 304, however again mirrors 340 are used rather than multimode fibers and coupling elements.

Projection systems 302, 304, 306, and 308 use laser sources 310 which are set to wavelengths and power ratios required to reduce the SCR to an imperceptible level and to produce a color gamut matching a desired color gamut.

Figure 12:
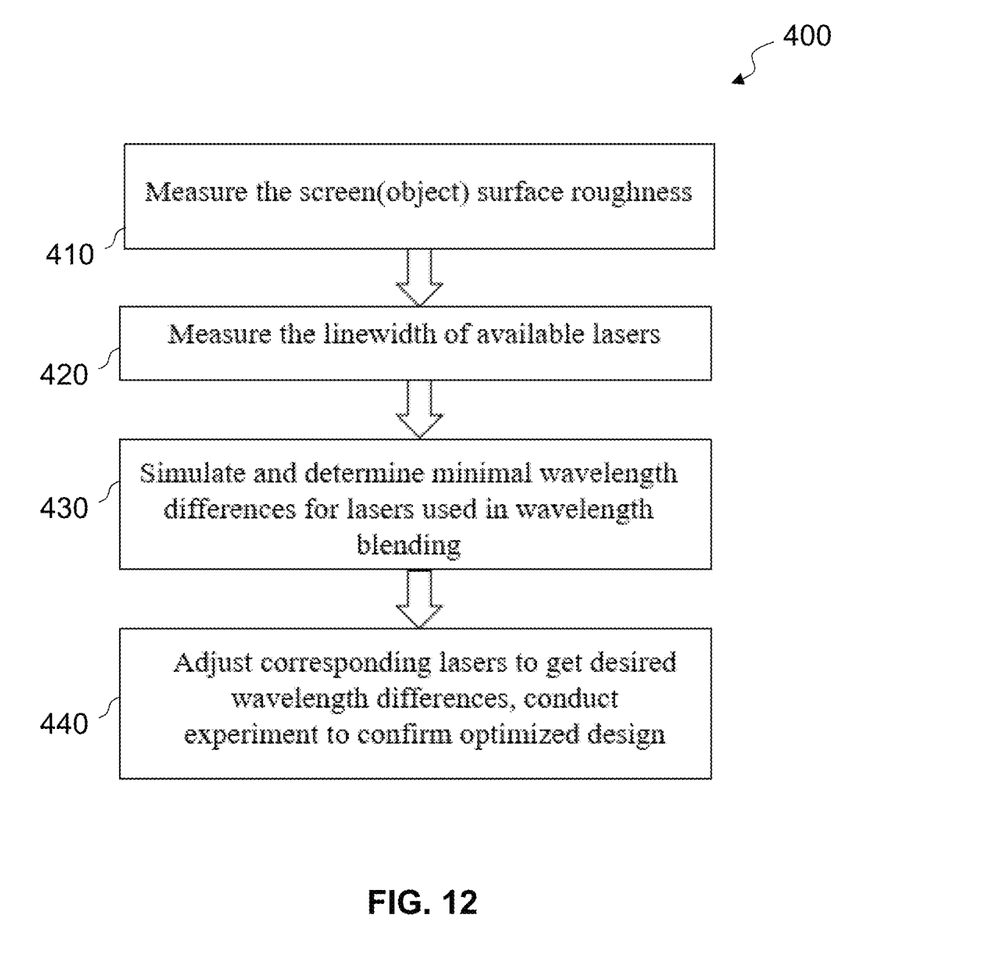
FIG. 12 is a flow chart of a method of optimizing wavelength blending.

A method of optimizing wavelength blending for laser speckle reduction is shown in FIG. 12. At step 410 of method 400, the screen surface roughness is measured to calculate $\sigma_h$. Different screens will have different $\sigma_h$. For a conventional print paper, the $\sigma_h$ is around 100 µm. At step 420, the linewidth information of available lasers is determined. For example, semiconductor laser diodes usually have a linewidth of around 1.2 nm, while diode pumped solid state lasers usually have a linewidth of around 0.1 nm. At step 430, the wavelength interval required for an acceptable wavelength diversity is calculated. At step 440, the lasers are adjusted to obtain the desired wavelength interval. For example, laser diodes can use different gain material to change the center wavelength. The center wavelength can also be adjusted by changing the working temperature of laser diodes.

Figure 13:
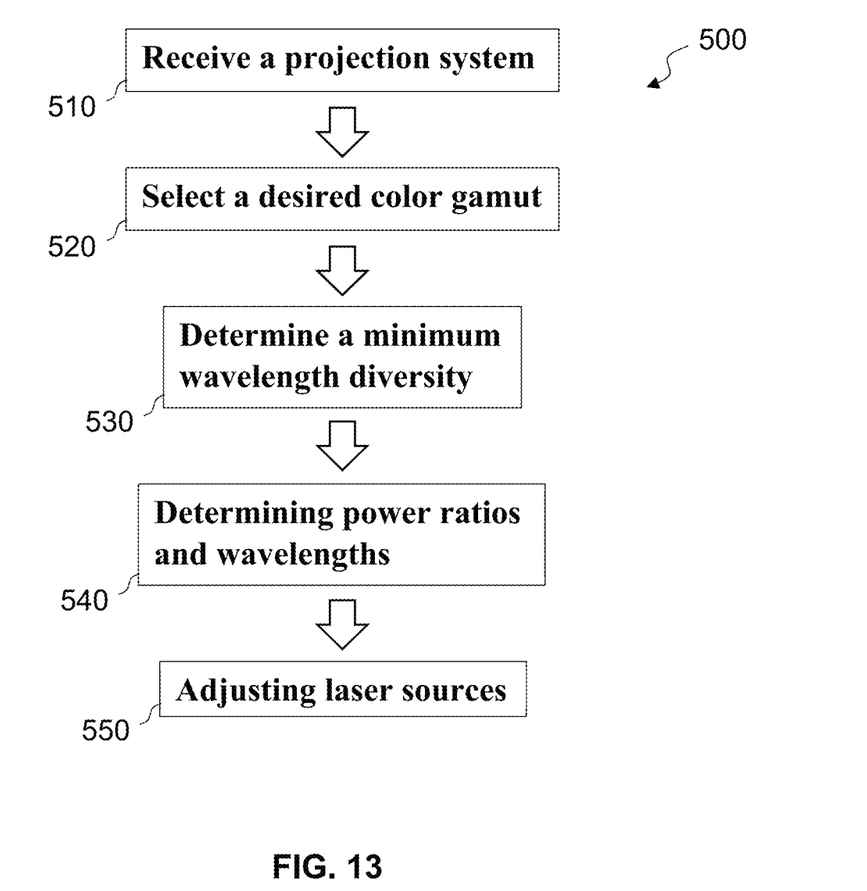
FIG. 13 is a flow chart of a method of image projection.

A method of image projection is shown in FIG. 13. At step 510 of method 500 a projection system including a plurality of laser sources is received. At step 520 a desired color gamut is selected. At step 530 a minimum wavelength diversity for the projection system to maintain a speckle level below an imperceptible level is determined. At step 540 a power ratio and a wavelength is determined for each laser source of the plurality of laser sources, to allow the projection system to produce the desired color gamut while maintaining at least the minimum wavelength diversity. At step 550 each laser source of the plurality of laser sources is adjusted to have the determined power ratio and wavelength so that the best color and minimum speckle contrast ratio can be achieved.

In some embodiments, a system may include an input device and at least one processor. For example, an input device may include a touchscreen interface, a set of sensors, and/or a keyboard. The input device is configured to receive a set of operational parameters of an expected operational environment, the set of operational parameters including a standard deviation of surface height fluctuation of a projection surface, an incident angle, and an observational angle. The at least one processor is coupled to the input device to receive the set of desired chromaticity coordinates and the set of operational parameters. The at least one processor is also coupled to the plurality of laser sources to set the plurality of power ratios and the plurality of power spectrum density functions to generate a normalized power spectrum density function of the projector system. For example, the normalized power spectrum density function may be set to produce the set of desired chromaticity coordinates and a wavelength diversity factor of at least 2 in the expected operational environment.

Figure 14:
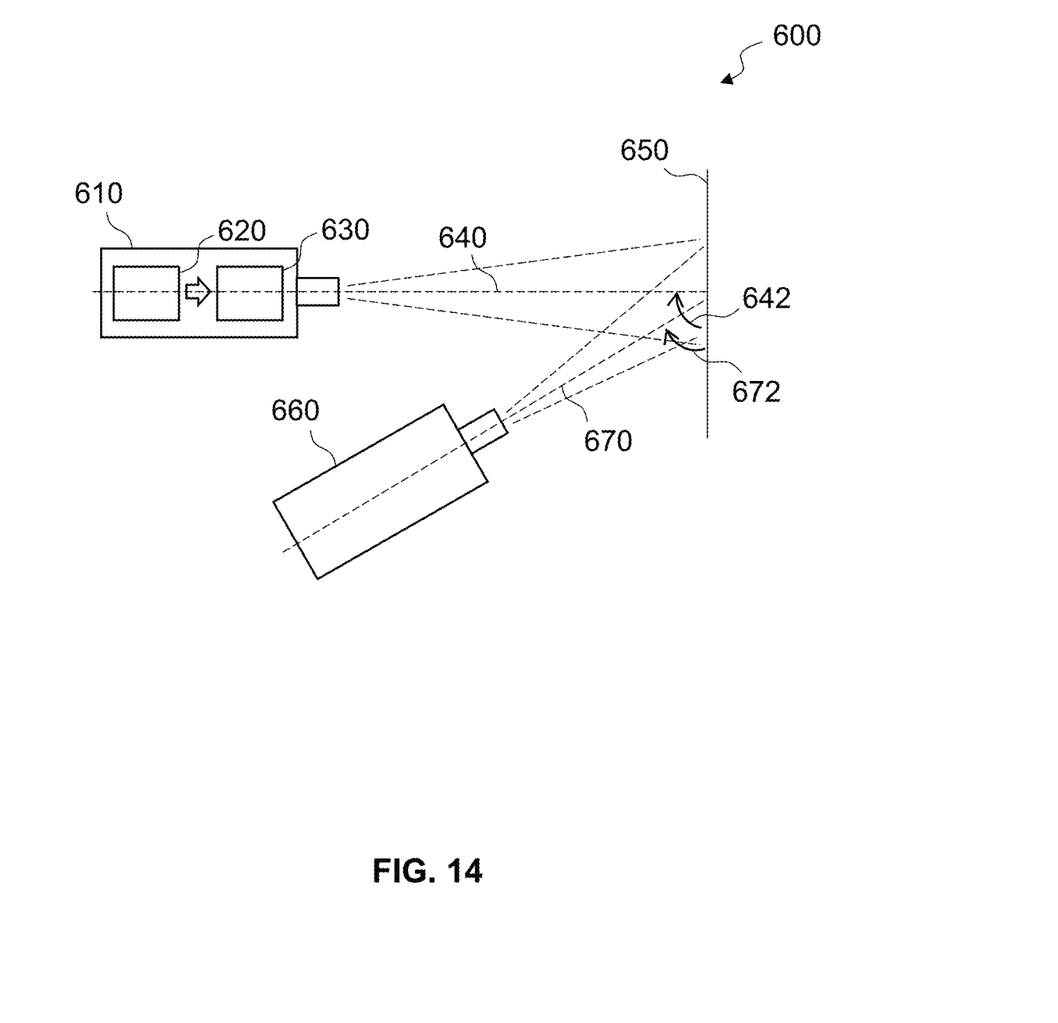
FIG. 14 is a schematic diagram of a projection system in an operational environment.

Depicted in FIG. 14 is a projection system 610 in an operational environment. Projection system 610 contains a plurality of laser sources, each laser source having an independently adjustable power ratio and an independently adjustable power spectrum density function. Projection system 610 also contains an input touchscreen 620 and a processor 630 coupled to the input touchscreen 620 to receive input from the touchscreen 620. Processor 630 is operatively coupled to the set of laser sources of projection system 610 to adjust the power ratio and power spectrum density function of each laser source. Projection system 610 is set up to project along an incident axis 640 onto a projection screen 650, the incident axis 640 forming an incident angle 642 with projection screen 650. Observation camera 660 is set up to observe screen 650 along an observation axis 670, the observation axis 670 forming an observation angle 672 with projection screen 650. Projection screen 650 has a standard deviation of surface height fluctuation contributing to speckle production. Data from observation camera 660, such as observation angle 672, can be used as input for processor 630.

The present invention has been described here by way of example only. Various modification and variations may be made to exemplary embodiments without departing from the scope of the invention, which is limited only by the appended claims.

The invention claimed is:

1. A method of image projection, comprising:
   selecting a set of desired chromaticity coordinates of a projection system, the projection system including a plurality of laser sources;
   determining a set of operational parameters of an expected operational environment, the set of operational parameters including a standard deviation of surface height fluctuation of a projection surface, an incident angle, and an observation angle; and
   configuring a power ratio and a power spectrum density function of each laser source, the plurality of power ratios and power spectrum density functions generating a normalized power spectrum density function of the projection system having the set of desired chromaticity coordinates and a wavelength diversity factor of at least 2 in the expected operational environment.

2. The method of claim 1, wherein the projection system has a projection path extending between the plurality of laser sources to a projection lens, the projection path including at least one homogenization component.

3. The method of claim 2, wherein the at least one homogenization component includes a diffuser and at least one of a light pipe and/or a pair of lens arrays.

4. The method of claim 2, wherein the projection path includes at least one coupling element between the plurality of laser sources and the at least one homogenization component.

5. The method of claim 4, wherein the coupling element is at least one of a fiber bundle and a mirror.

6. The method of claim 4, wherein the projection path includes a spatial light modulator between the at least one homogenization component and the projection lens and at least one intermediate optical elements between the at least one homogenization component and the spatial light modulator.

7. The method of claim 1, wherein the plurality of laser sources includes a group of green channel laser sources to produce a green chromaticity coordinate of the set of desired chromaticity coordinates, a group of red channel laser sources to produce a red chromaticity coordinate of the set of desired chromaticity coordinates, and a set of blue channel laser sources to produce a blue chromaticity coordinate of the set of desired chromaticity coordinates.

8. The method of claim 7, wherein the set of desired chromaticity coordinates is a set of Rec.2020 chromaticity coordinates.

9. The method of claim 7, wherein the group of green channel laser sources including a set of at least one semiconductor laser diode and a set of at least one diode pumped solid state laser, the at least one semiconductor laser diode having a power ratio of 0.2 and the at least one diode pumped solid state laser having a power ratio of 0.8.

10. The method of claim 9, wherein the set of at least one semiconductor laser diode has a center wavelength of 515 nm and the set of at least one diode pumped solid state laser has a center wavelength of 532 nm.

11. The method of claim 10, herein the set of at least one semiconductor laser diode includes at least two semiconductor laser diodes with a wavelength difference of at least 1.5 nm therebetween and the set of at least one diode pumped solid state laser includes at least two diode pumped solid state lasers with a wavelength difference of at least 0.7 nm therebetween.

12. A projection system, comprising:
   an input device configured to receive a set of desired chromaticity coordinates and a set of operational parameters of an expected operational environment, the set of operational parameters including a standard deviation of surface height fluctuation of a projection surface, an incident angle, and an observational angle;
   a plurality of laser sources each having an independently configurable power ratio and an independently configurable power spectrum density function;
   at least one processor coupled to the input device to receive the set of desired chromaticity coordinates and the set of operational parameters, the at least one processor coupled to the plurality of laser sources to set the plurality of power ratios and the plurality of power spectrum density functions to generate a normalized power spectrum density function of the projection system, the normalized power spectrum function producing the set of desired chromaticity coordinates and a wavelength diversity factor of at least 2 in the expected operational environment; and a projection path extending between the plurality of laser sources and a projection lens.

13. The projection system of claim 12, wherein the projection system includes at least one homogenization component in the projection path.

14. The projection system of claim 13, wherein the at least one homogenization component includes a diffuser and at least one of a light pipe and/or a pair of lens arrays.

15. The projection system of claim 13, wherein the projection path includes at least one coupling element between the plurality of laser sources and the at least one homogenization component.

16. The projection system of claim 15, wherein the coupling element is at least one of a fiber bundle and a mirror.

17. The projection system of claim 15, wherein the projection path includes a spatial light modulator between the at least one homogenization component and the projection lens and at least one intermediate optical elements between the at least one homogenization component and the spatial light modulator.

18. The method of claim 12, wherein the plurality of laser sources includes a group of green channel laser sources to produce a green chromaticity coordinate of the set of desired chromaticity coordinates, a group of red channel laser sources to produce a red chromaticity coordinate of the set of desired chromaticity coordinates, and a set of blue channel laser sources to produce a blue chromaticity coordinate of the set of desired chromaticity coordinates.

19. The method of claim 18, wherein the set of desired chromaticity coordinates is a set of Rec.2020 chromaticity coordinates.

20. The projection system of claim 18, wherein the group of green channel laser sources includes a set of at least one semiconductor laser diode and a set of at least one diode pumped solid state laser, the at least one semiconductor laser diode having a power ratio of 0.2 and the at least one diode pumped solid state laser having a power ratio of 0.8.

21. The projection system of claim 20, wherein the set of at least one semiconductor laser diode has a center wavelength of 515 nm and the set of at least one diode pumped solid state laser has a center wavelength of 532 nm.

22. The projection system of claim 21, wherein the set of at least one semiconductor laser diode includes at least two semiconductor laser diodes with a wavelength difference of at least 1.5 nm therebetween and the set of at least one diode pumped solid state laser includes at least two diode pumped solid state lasers with a wavelength difference of at least 0.7 nm therebetween.

* * * * *